(12) United States Patent
Poe (10) Patent No.: US 8,887,840 B2
(45) Date of Patent: Nov. 18, 2014

(54) ZERO-TURN LAWNMOWER WITH IMPROVED CONTROL HANDLES

(75) Inventor: Aaron Samuel Poe, Warrensburg, MO (US)

(73) Assignee: Swisher Acquisition, Inc., Warrensburg, MO (US)

( * ) Notice: Subject to any disclaimer, the term of this patent is extended or adjusted under 35 U.S.C. 154(b) by 37 days.

(21) Appl. No.: 13/569,602

(22) Filed: Aug. 8, 2012

(65) Prior Publication Data
US 2014/0041952 A1    Feb. 13, 2014

(51) Int. Cl.
*B62D 11/04*    (2006.01)
(52) U.S. Cl.
USPC ............... 180/6.2; 180/6.4; 56/10.5; 56/15.2
(58) Field of Classification Search
CPC ............................ B62D 11/006; A01D 34/824
USPC ........ 180/6.2, 6.32, 6.34, 6.4, 315, 19.3, 332; 56/10.2, 10.4, 10.5, 10.8, 15.2, 15.8, 56/17.1
See application file for complete search history.

(56) References Cited

U.S. PATENT DOCUMENTS

| | | | |
|---|---|---|---|
| 3,047,085 A * | 7/1962 | Kieffer, III et al. | 180/366 |
| D390,237 S | 2/1998 | Smith | |
| 5,915,487 A * | 6/1999 | Splittstoesser et al. | 180/19.1 |
| 6,708,805 B2 * | 3/2004 | Samejima et al. | 192/13 A |
| 7,302,789 B2 * | 12/2007 | Eavenson et al. | 56/11.8 |

* cited by examiner

*Primary Examiner* — Joseph M Rocca
*Assistant Examiner* — Jacob Knutson
(74) *Attorney, Agent, or Firm* — Hovey Williams LLP (57) ABSTRACT

A lawnmower includes a chassis; a seat supported on the chassis for permitting an operator to sit or stand on the chassis; a pair of drive wheels for supporting the chassis above a ground surface; an engine and a pair of transmissions for driving the drive wheels; and a pair of manually-moveable handle assemblies for controlling the transmissions. Each handle assembly includes a substantially vertically-extending control handle, wherein the control handles are mounted outboard of opposite sides of the seat so as not to block the operator's ingress or egress from the seat.

11 Claims, 8 Drawing Sheets

ZERO-TURN LAWNMOWER WITH IMPROVED CONTROL HANDLES

BACKGROUND

A zero-turn mower is basically a riding lawn mower with a turning radius that is effectively zero inches. Such mowers can reduce the amount of time required to mow yards and other areas because they can cut closely around trees, fences, and other obstacles and therefore reduce or even eliminate the need for trimming. Another advantage of these mowers is that they pivot through 180 degrees without leaving a circle of uncut grass.

Different brands and models achieve a zero-turn radius in different ways, but hydraulic speed control of the drive wheels is the most common method. A typical zero-turn mower has each of its rear wheels connected to a separate hydrostatic transmission—a device that creates wheel rotation using pressurized fluid. Rotational force from an engine turns a pump that pressurizes transmission fluid. A steering/speed lever, joystick or other user control device may be moved to control the flow of fluid through each transmission and thus control the rotational speed or the forward/reverse direction of each drive wheel. If one drive wheel turns more rapidly than the other, the mower moves along a curved path. If both wheels turn at the same speed, the mower follows a straight path. If one wheel stops and the other turns, or if the wheels turn in opposite directions, the mower pivots or rotates.

SUMMARY

Applicant has discovered that the user control devices on known zero-turn mowers suffer from several disadvantages. For example, some zero-turn mowers have lap bar handles that are, as the name implies, positioned over an operator's lap while the operator is seated in the mower. Such lap bar handles can interfere with the operator's entry and exit from the mower and thus can pose a safety risk when rapid exit from the mower is desired. Other zero-turn mowers include handles, bars, and other mechanisms that are difficult or tiresome to manipulate, especially when mowing for lengthy periods. Still other zero-turn mowers include joystick controllers that are not intuitive to operate and expensive to manufacture and repair. Many user control devices for zero-turn mowers also have numerous parts that are prone to break. Accordingly, there is a need for improved user control devices for a zero-turn mower that overcomes the limitations of the prior art.

The present invention solves the above-described problems and provides a distinct advance in the art of zero-turn mowers and user control devices for the same. Some embodiments of the invention provide a zero-turn mower with a user control device that does not interfere with an operator's ingress or egress from the mower, is easy and intuitive to operate, provides precise and responsive steering and speed control, is ergonomically designed to reduce operator effort and fatigue, and includes fewer parts than many prior art user control devices.

A zero-turn mower constructed in accordance with an embodiment of the invention broadly comprises a chassis; a seat supported on the chassis for permitting an operator to sit or stand on the chassis; a mower deck with one or more mowing blades attached to or supported under the chassis; a pair of rear drive wheels and a pair of front wheels for supporting the chassis and mower deck above a ground surface; an engine; a pair of transmissions coupled between the engine and the drive wheels for driving the drive wheels; and a pair of manually-moveable handle assemblies for controlling the transmissions and thus controlling the speed and direction of the mower.

Each handle assembly is operatively connected to one of the transmissions for controlling the direction and speed of one of the drive wheels. An embodiment of each handle assembly broadly comprises a mounting bracket, a handle bracket, a control handle, and a linkage assembly.

In accordance with one aspect of the invention, the control handles extend upwardly rather than horizontally and are mounted outboard of opposite sides of the seat. No part of the handles extend in front of the operator's lap or torso while the operator is seated on the mower. This allows the operator to quickly and easily enter and exit the mower with no obstruction from the control handles.

In accordance with another aspect of the invention, the handle bracket and linkage assembly are cooperatively configured so that the handle has an approximately 40 degree range of motion. Specifically, the handle pivots approximately 20 degrees forward to place the transmission in a full forward speed and approximately 20 degrees rearward to place the transmission in a full reverse speed. Applicant has discussed that this provides optimal steering response while also permitting the operator to manipulate the handles primarily with his hands and fingers with little arm movement to reduce fatigue.

In accordance with yet another aspect of the invention, the linkage assembly includes a linking rod connected directly between the handle bracket and a pick-up point on one of the transmissions. Movement of the handle causes the linkage to directly move the pick-up point for controlling operation of the transmission with no intervening links, gears, etc. This provides more precise steering control and reduces the likelihood of parts failures.

The handle assemblies of the present invention provide numerous advantages over existing control devices for zero-turn mowers. For example, because the handle assemblies do not interfere with an operator's ingress or egress from the mower, they improve the safety of the mower. The handle assemblies are also easy and intuitive to operate and provide precise and responsive steering and speed control. The handle assemblies are also ergonomically designed to reduce operator fatigue and include fewer parts than many prior art user control devices.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

A lawnmower 10 constructed in accordance with various embodiments of the invention is illustrated in the drawing figures. The lawnmower 10 may be a zero-turn radius type lawnmower or any other type of mower with a small turning radius.

Figure 1:
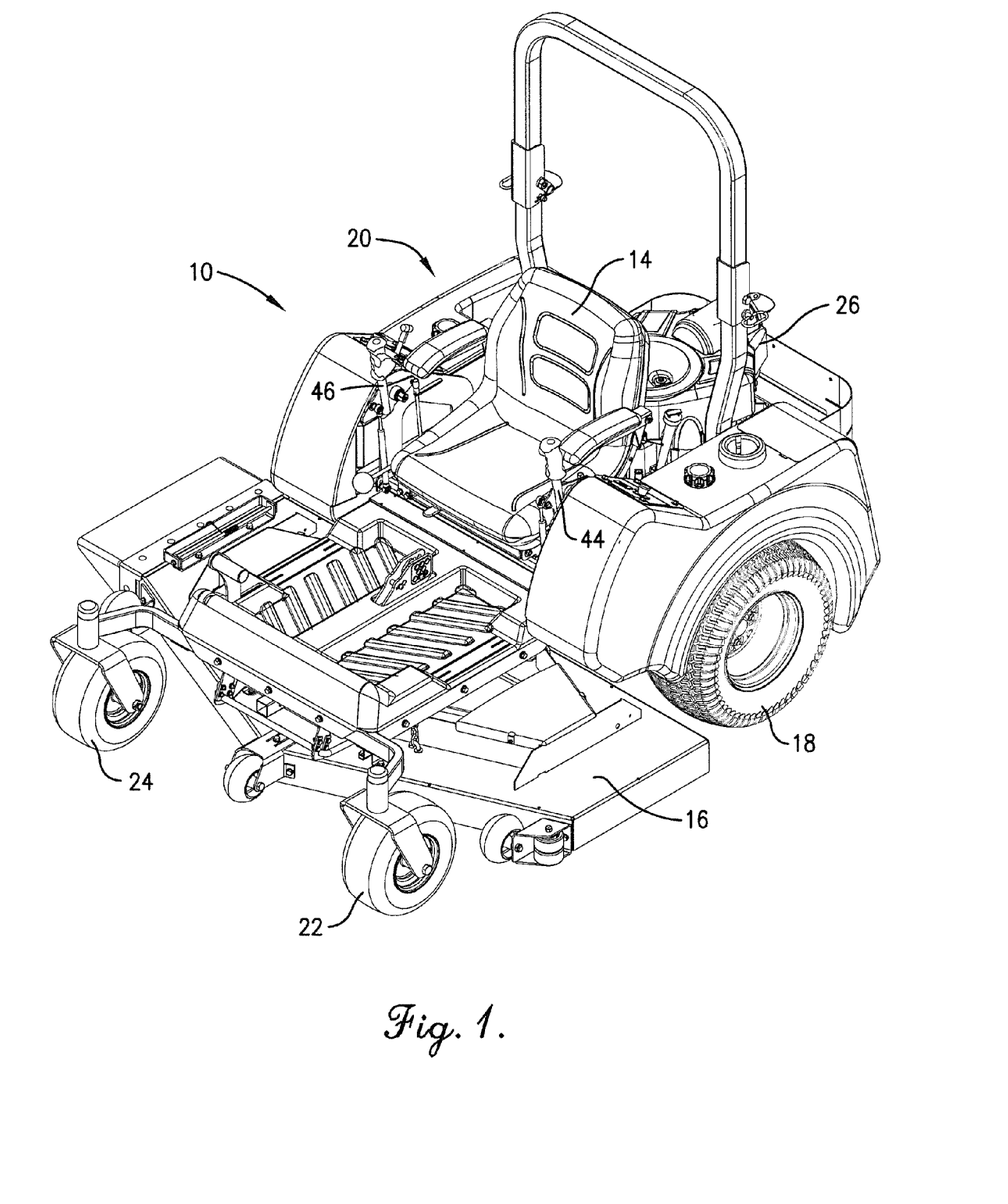
FIG. 1 is a perspective view of an exemplary zero-turn mower on which handle assemblies constructed in accordance with embodiments of the invention may be installed.
Figure 2:
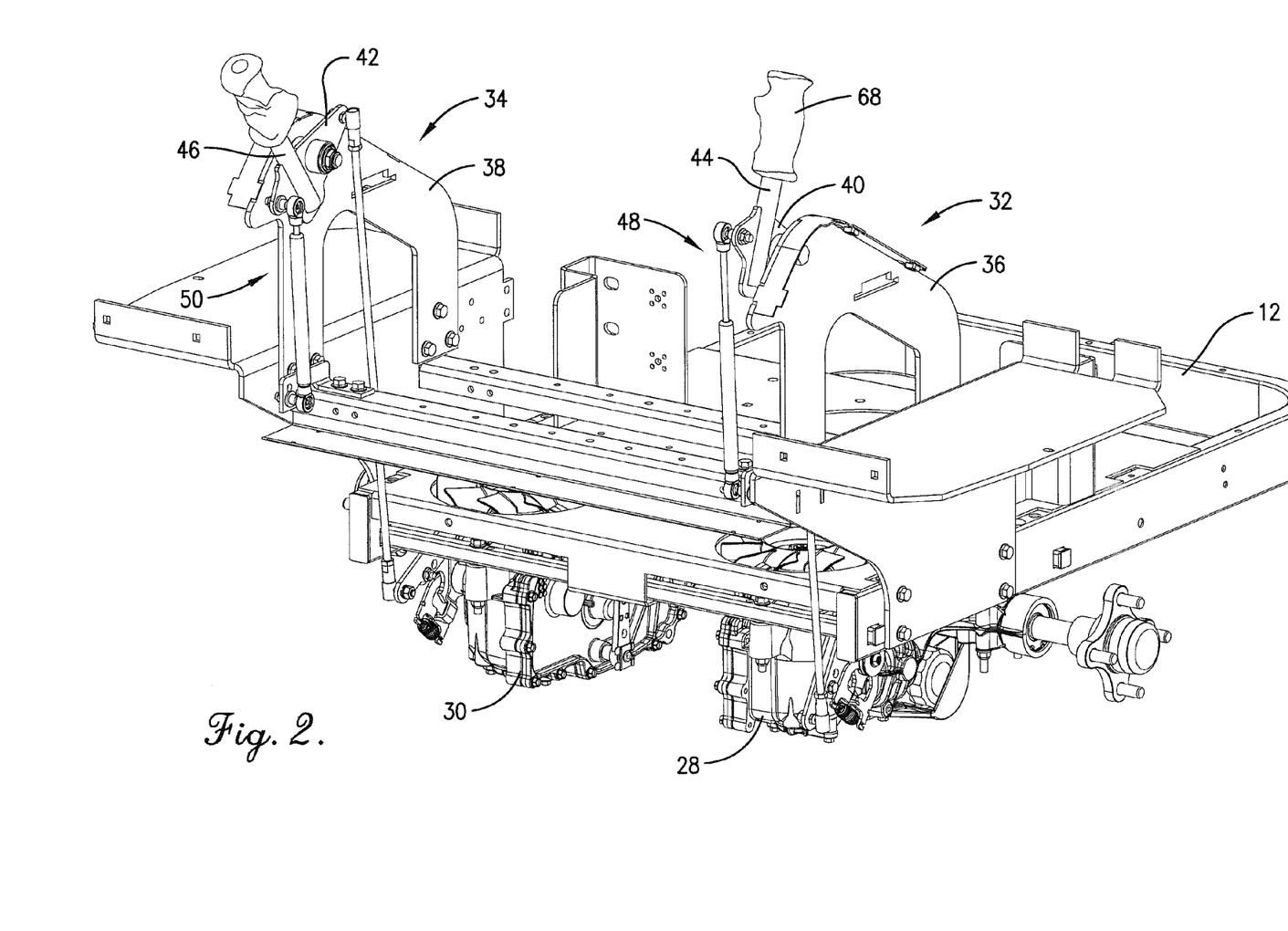
FIG. 2 is a perspective view of the zero-turn mower of FIG. 1 with parts removed to more clearly depict the attachment of the handle assemblies.

Initially referring to FIGS. 1 and 2, an embodiment of the mower 10 broadly comprises a chassis 12; a seat 14 supported on the chassis for permitting an operator to sit or stand on the mower; a mower deck 16 with one or more cutting blades notably attached to or supported under the chassis; a pair of rear drive wheels 18, 20 and a pair of front wheels 22, 24 for supporting the chassis and mower deck above a ground surface; an engine 26; a pair of transmissions 28, 30 coupled between the engine and the drive wheels for driving the drive wheels; and a pair of manually-moveable handle assemblies 32, 34 for controlling the transmissions and thus controlling the speed and direction of the mower.

The chassis 12, seat 14, mower deck 16, rear drive wheels 18, 20, front wheels 22, 24, engine 26, and transmissions 28, 30 are conventional and are thus not described in detail herein. Embodiments of the lawnmower 10 may also comprise conventional fuel tanks, body panels, electrical control systems, steering assemblies, batteries, and other components that will also not be described in detail herein. The handle assemblies 32, 34 may be installed on any size and type of lawnmower. Thus, the present invention is not limited to the particular mower 10 described and illustrated herein.

The handle assemblies 32, 34 of the present invention provide numerous advantages over existing control devices for zero-turn mowers. For example, embodiments of the handle assemblies do not interfere with an operator's entry onto or exit from the mower and therefore improve the safety of the mower. Embodiments of the handle assemblies are also easy and intuitive to operate and provide precise and responsive steering and speed control. Embodiments of the handle assemblies are also ergonomically designed to reduce operator fatigue and include fewer parts than many prior art user control devices.

Specific embodiments of the handle assemblies 32, 34 will now be described in more detail with reference to FIGS. 2-8. As best illustrated in FIG. 2, each handle assembly 32, 34 is operatively connected to one of the transmissions 28, 30 for controlling the direction and speed of the drive wheels. The two handle assemblies are substantially identical, with one 32 operable to control the mower's left-side transmission and rear drive wheel and the other 34 operable to control the mower's right-side transmission and rear drive wheel. Each handle assembly 32, 34 broadly comprises a mounting bracket 36, 38, a handle bracket 40, 42, a control handle 44, 46, and a linkage assembly generally denoted by numerals 48, 50. Because the handle assemblies 32, 34 are similar, only the components of the left side handle assembly 32 (when viewed from operator's perspective while sitting in the seat) is described in detail herein.

The mounting bracket 36 for the left side handle assembly 32 is fixedly attached to a surface adjacent a left side of the seat 14 and provides support for the other components of the handle assembly. In one embodiment, the mounting bracket 36 is positioned below an outside edge of the seat's left armrest as best depicted in FIG. 1. Likewise, the mounting bracket 38 for the right side handle assembly 34 is fixedly attached to a surface adjacent a right side of the seat below the right armrest.

Figure 3:
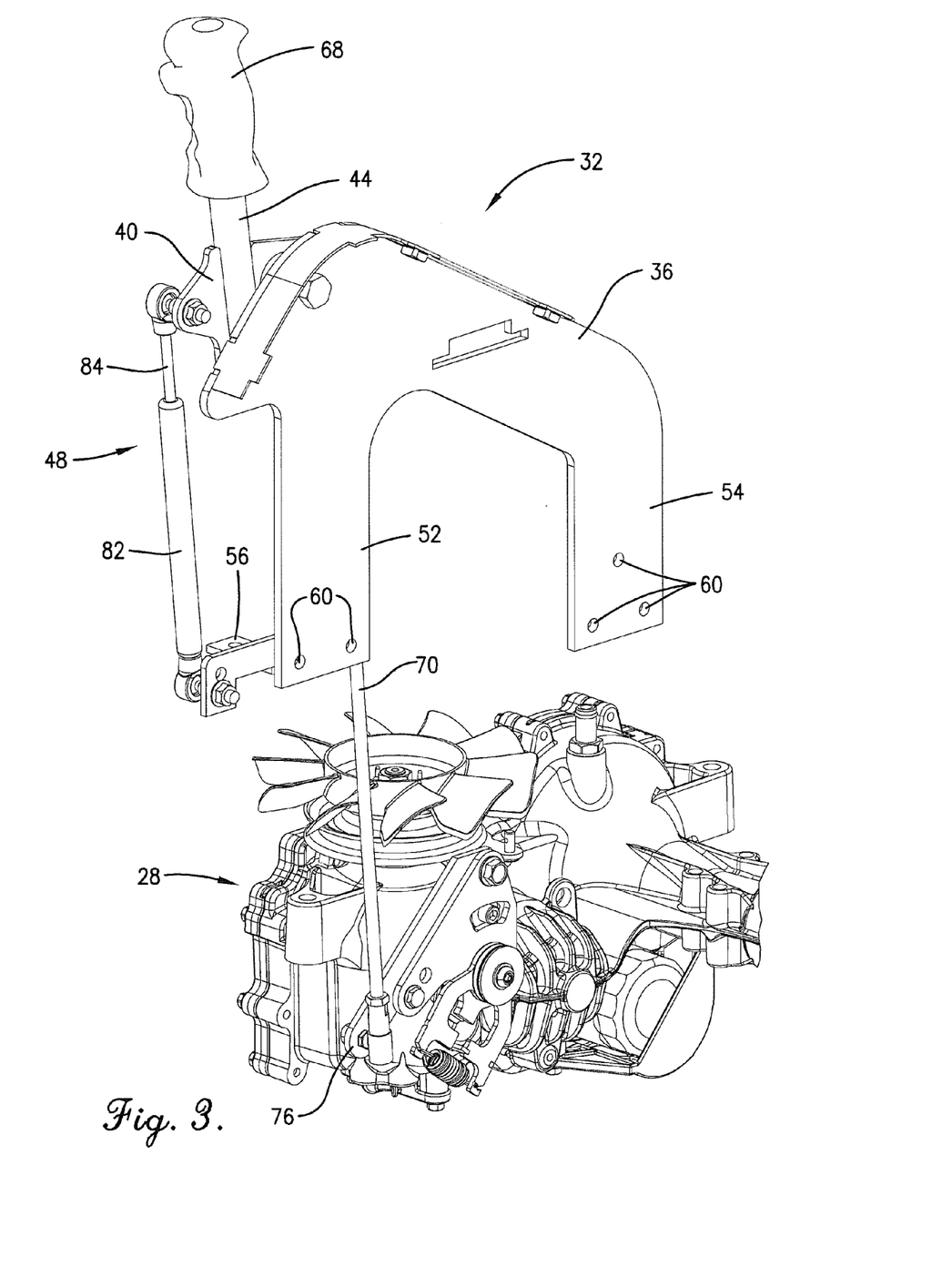
FIG. 3 is a rear perspective view of one of the handle assemblies and its corresponding transmission.
Figure 4:
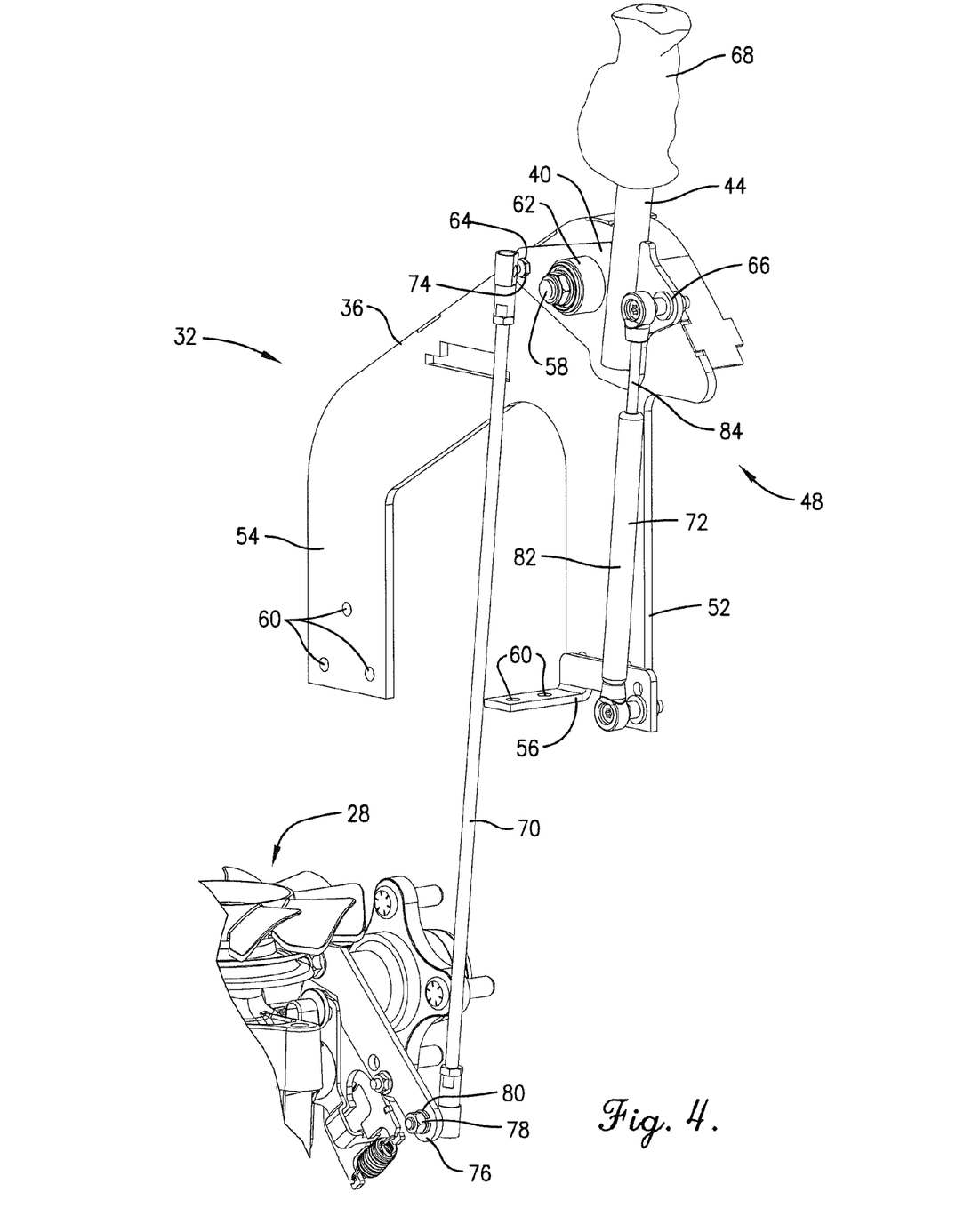
FIG. 4 is a front perspective view of the handle assembly of FIG. 3.

Referring now to FIGS. 3 and 4, an embodiment of the mounting bracket 36 is n-shaped and includes a pair of depending legs 52, 54. A bracket 56 for attaching a dampening cylinder (described below) may be attached to the bottom of the leg 52. A mounting pin or rod 58 for coupling with the handle bracket 40 may extend horizontally from the top of the leg 52. Mounting holes 60 may be formed in both legs 52, 54 and the bracket 56 for receiving screws, bolts, or other fasteners for attaching the mounting bracket to the mower.

The handle bracket 40 supports the handle 44 and is pivotally coupled to the mounting bracket 36 by a bearing 62 mounted over the mounting pin 58. The mounting pin 58 and bearing 62 define a handle pivot point with a generally horizontally-extending axis about which the handle bracket 40 and handle 44 pivot. Thus, the handle 44 may pivot forwardly and backwardly in a generally vertically-extending plane about the handle pivot point. The left side of the handle bracket (when viewed from the perspective of FIG. 4) includes a mounting hole 64 for coupling with a linking rod described below, and the right side of the bracket includes a mounting hole 66 for coupling with a dampening cylinder described below.

The control handle 44 is attached to and extends upwardly from the handle bracket 40. A conventional grip 68 may be placed over the top of the handle. An embodiment of the control handle is formed from a length of tubular metal and is between 4" and 12" in length. In a particular embodiment, the control handle is approximately 9" long so that it extends approximately 8" above the handle pivot point. Applicant has discovered that this length, in cooperation with other features of the invention described herein, provides optimal control, responsiveness, and ergonomics as described in more detail below.

The linkage assembly 48 connects the handle bracket 40 to the transmission 28 and provides for smooth and consistent movement of the handle 44. An embodiment of the linkage assembly 48 comprises a linking rod 70 and a dampening cylinder 72.

The linking rod 70 connects the handle bracket 40 to the transmission 28 so that movement of the handle 44 controls the speed and direction of the drive wheel. Specifically, the upper end of the linking rod 70 is pivotally connected to the handle bracket 40 by a mounting pin 74 that is received in the mounting hole 64 of the handle bracket. The lower end of the linking rod 70 is connected to a pick-up point 76 on the transmission by a mounting pin 78 that is received in a mounting hole 80 in the pick-up point. Importantly, the linking rod 70 is connected directly between the handle bracket 40 and the transmission pick-up point 76 so that movement of the handle 44 causes the rod to directly move the pick-up point 76 without any intervening gears, levers, links, etc.

The dampening cylinder 72 provides for smooth and consistent movement of the control handle 44. An embodiment of the dampening cylinder 72 includes a housing or cylinder portion 82 that is pivotally connected to the bracket 56 and an extendable piston 84 that is pivotally connected to the mounting hole 66 in the left side of the handle bracket.

Figure 5:
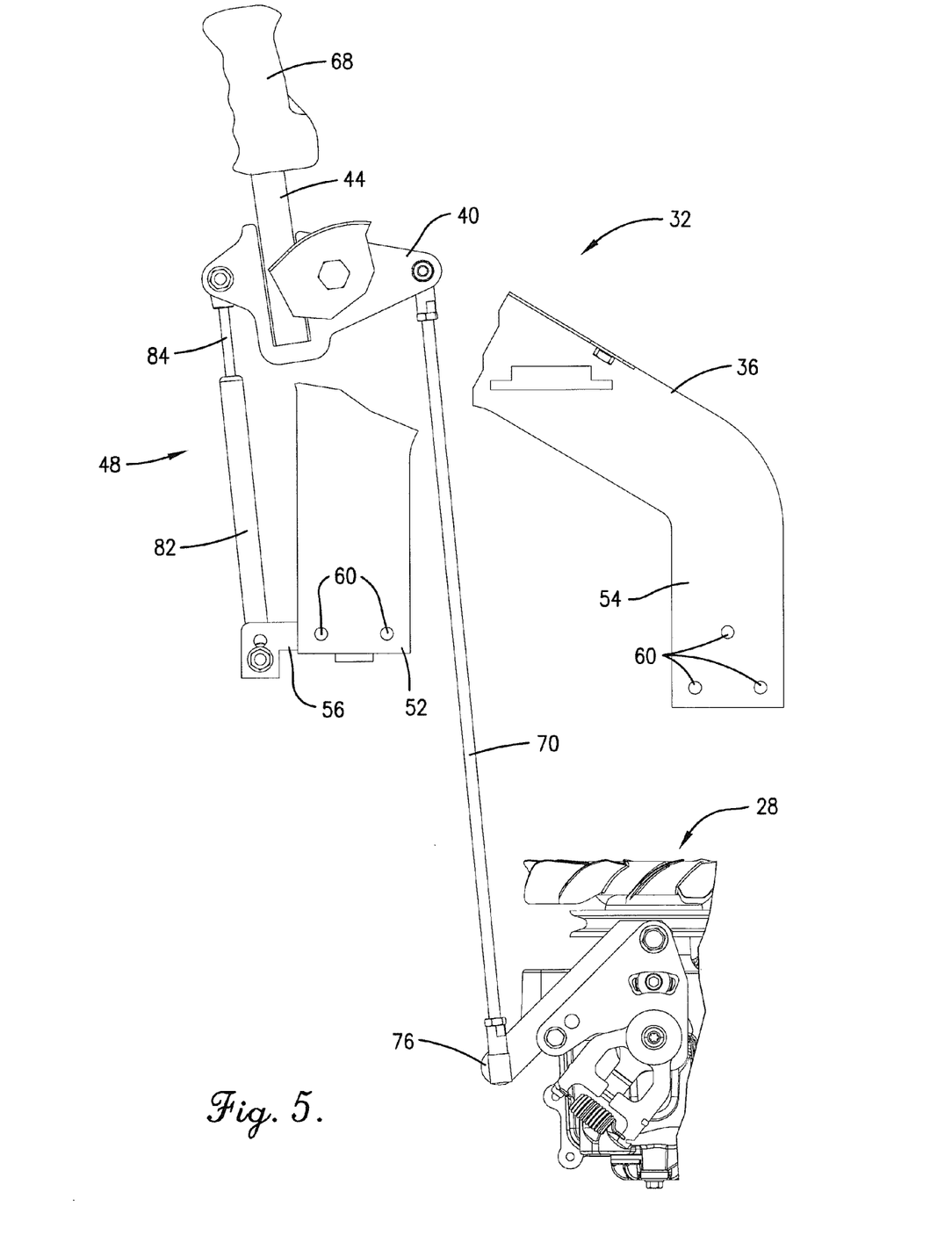
FIG. 5 is a rear elevational view of the handle assembly of FIG. 3 with its control handle shown in a neutral position.
Figure 6:
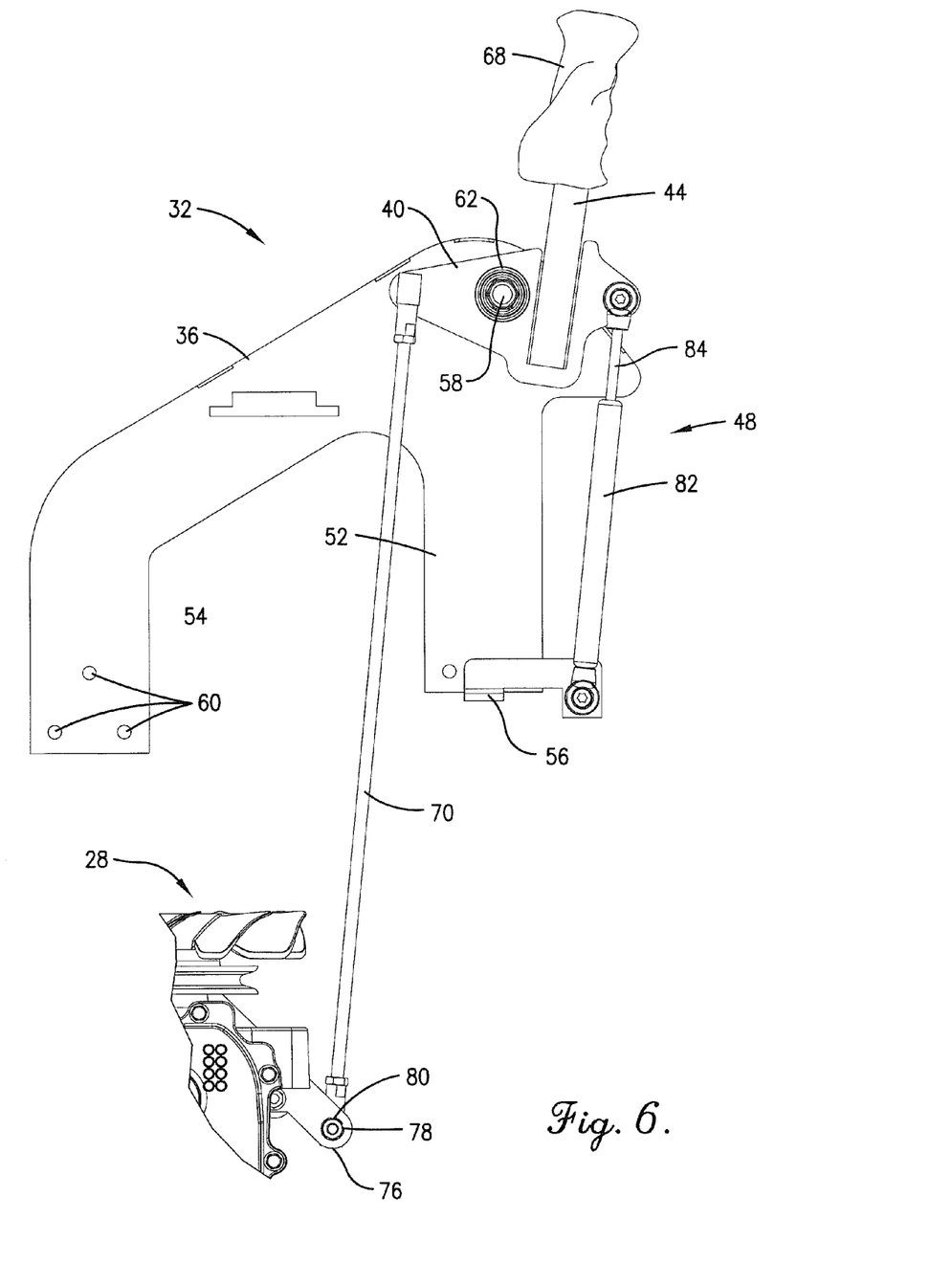
FIG. 6 is a front elevational view of the handle assembly of FIG. 3 with its control handle shown in a neutral position.
Figure 7:
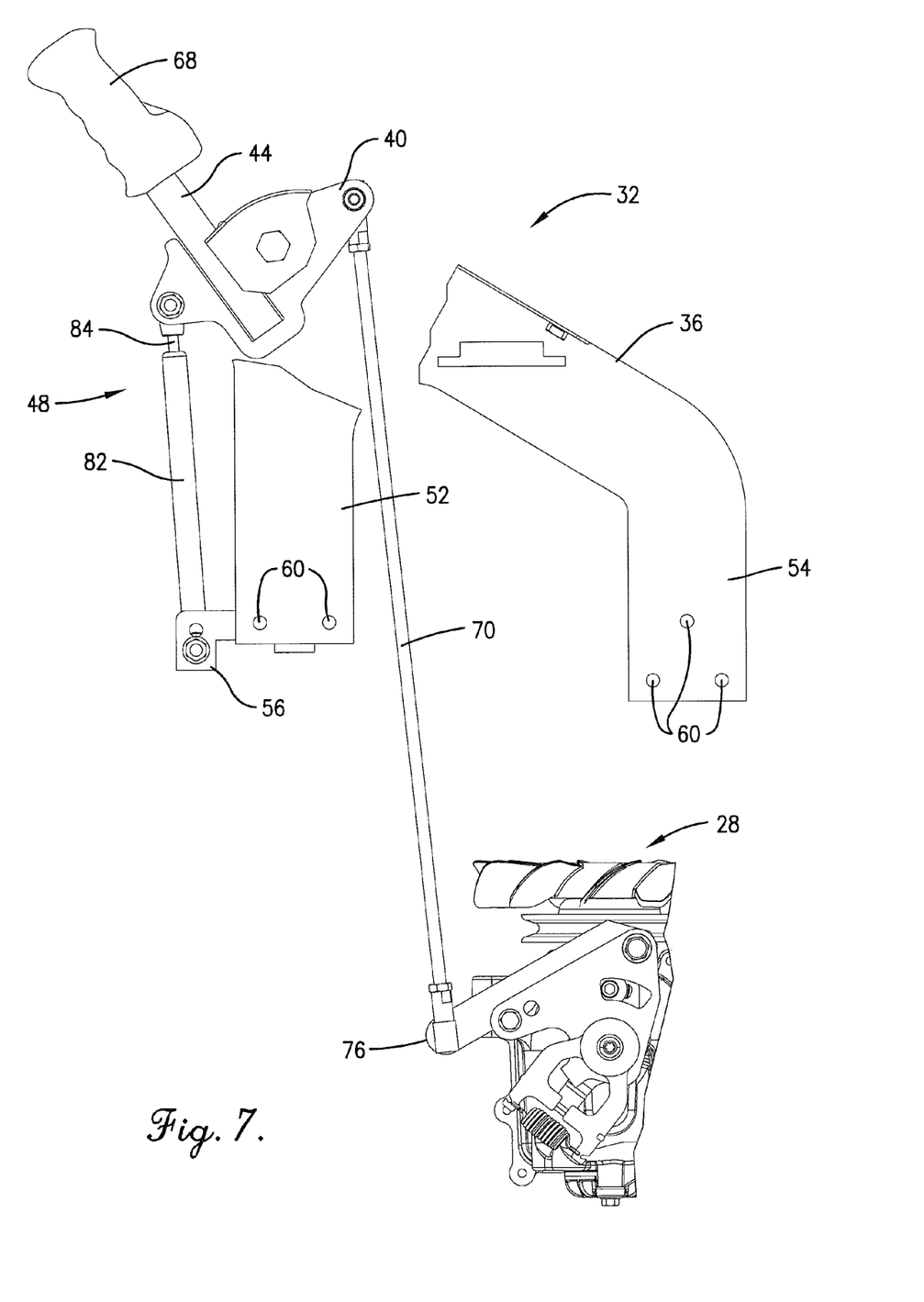
FIG. 7 is a rear elevational view of the handle assembly of FIG. 3 with its control handle shown in its forwardmost position.

Control of the transmission 28 with the handle assembly 32 will now be described with reference to FIGS. 5-8. FIGS. 5 and 6 illustrate the positioning of the handle assembly when the transmission is in neutral. As shown, the handle 44 has a forward lean of approximately 5-10° from vertical. When the handle 44 is moved forwardly, the linking rod 70 pulls the transmission pick-up point 76 upwardly as depicted in FIG. 7 to drive the left drive wheel in a forward direction. The forward speed of the drive wheel is determined by the degree of movement of the handle, with full forward speed being provided when the handle is moved to its forward limit.

Figure 8:
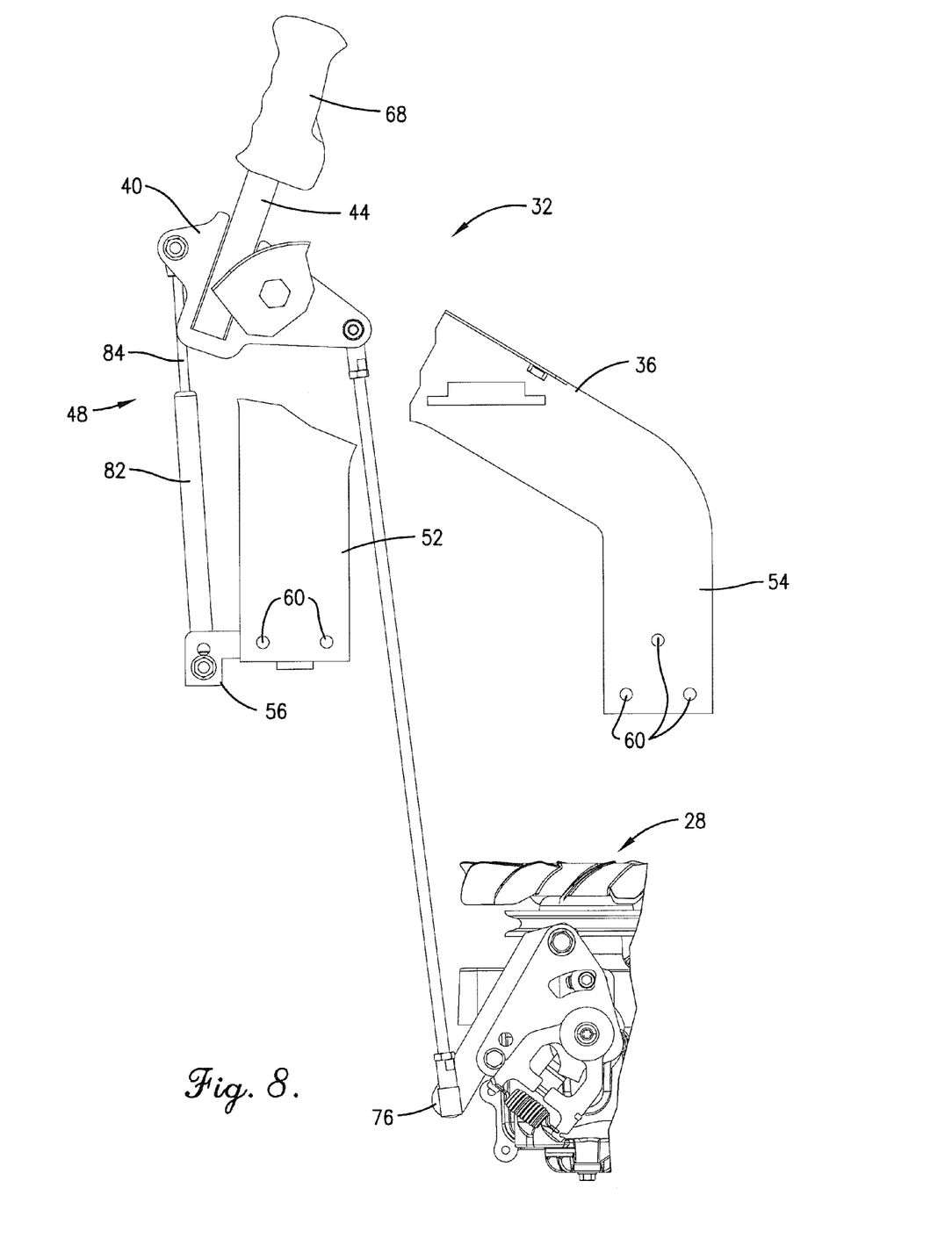
FIG. 8 is a rear elevational view of the handle assembly of FIG. 3 with its control handle shown in its rearwardmost position.

When the handle is moved rearwardly, the linking rod 70 pushes the transmission pick-up point 76 downwardly as depicted in FIG. 8 to drive the right drive wheel in a rearward direction. The rearward speed of the drive wheel is determined by the degree of movement of the handle, with full reverse speed being provided when the handle is moved to its rear limit.

In accordance with one aspect of the present invention, the handle bracket 40, linking rod 70, and dampening cylinder 72 are cooperatively configured to provide between 30°-50° range of motion (or throw) for the control handle 40 between its full forward and full reverse positions. In a particular embodiment, the handle has a 40° range of motion, with full forward speed being provided by a handle position 20° forward of neutral and full rearward speed being provided by a handle position 20° rearward of neutral. This provides optimal steering response and allows an operator to place his or her forearms in the armrests of the seat and move the control handle back and forth primarily with his or her hands with little arm movement.

In accordance with another aspect of the invention, the handle pivot point (as defined by the bearing 62 and mounting pin 58) and the linking rod attachment point (as defined by the mounting hole 64 and pin 74) are spaced approximately 1.5-3" apart. Applicant has discovered that this spacing provides optimal responsiveness, control and manual feedback for the control handle 44.

To use the mower 10, an operator seats himself in the seat 14 and places his forearms on the armrests or to his sides if no armrests are provided. Importantly, because the handle assemblies 32, 34 are positioned outboard of the seat and because the handles 44, 46 extend upwardly and not horizontally toward the seat, the operator can quickly and easily enter or exit the seat with no interference from the handle assemblies.

The operator then starts the mower in a conventional manner and moves the two handles 44, 46 back and forth to control the direction and speed of the mower. The desired length of the handles described above allows the operator to grip the handles while resting his forearms on the armrests. This allows the operator to operate the mower for longer periods of time with less fatigue. Moreover, the desired range of motion of the handles described above allows the operator to primarily control the mower with his hands with little arm movement.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A lawnmower comprising:
   a chassis;
   a seat including left and right armrests, the seat being supported on the chassis for permitting an operator to sit or stand on the chassis;
   a pair of drive wheels for supporting the chassis above a ground surface;
   an engine and a pair of transmissions for driving the drive wheels; and
   a pair of manually-moveable handle assemblies for controlling the transmissions, each handle assembly comprising:
   a mounting bracket;
   a handle bracket pivotally coupled to the mounting bracket about a horizontally-extending axis so that the handle bracket may pivot relative to the mounting bracket in a generally vertically-extending plane;
   a control handle formed about a single axis and attached to and extending upwardly from the handle bracket near an end of one of the armrests so that the operator may control the lawnmower by moving the control handle primarily with his or her hands while resting his or her forearm on the armrest;
   a linking rod attached directly between the handle bracket and a pick-up point on one of the transmissions so that movement of the handle causes the linking rod to directly move the pick-up point for controlling operation of the transmission; and
   a dampening cylinder pivotally connected between the mounting bracket and the handle bracket for smoothing movement of the control handle.

2. The lawnmower as set forth in claim 1, wherein the handle assemblies are mounted outboard of opposite sides of the seat so as not to block the operator's ingress or egress from the seat.

3. The lawnmower as set forth in claim 1, wherein the control handles are each 4-12 inches long.

4. The lawnmower as set forth in claim 3, wherein the control handles are each 6-10 inches long.

5. The lawnmower as set forth in claim 1, wherein the control handles each pivot approximately 40 degrees between a full forward position and a full reverse direction.

6. The lawnmower of claim 1, wherein the lawnmower is a zero-turn radius mower.

7. The lawnmower of claim 1, wherein the dampening cylinder includes a cylindrical housing pivotally connected to mounting bracket.

8. The lawnmower of claim 1, wherein the dampening cylinder includes an extendable piston pivotally connected to the handle bracket.

9. The lawnmower of claim 1, wherein each handle assembly further comprises a mounting pin connecting an upper end of the linking rod to the handle bracket.

10. The lawnmower of claim 1, wherein each handle assembly further comprises a mounting pin connecting a lower end of the linking rod to the pick-up point on the transmission.

11. A lawnmower comprising:
a chassis;
a seat including left and right armrests, the seat being supported on the chassis for permitting an operator to sit or stand on the chassis;
a pair of drive wheels for supporting the chassis above a ground surface;
an engine and a pair of transmissions for driving the drive wheels; and
a pair of manually-moveable handle assemblies for controlling the transmissions, each handle assembly comprising:
a mounting bracket;
a handle bracket pivotally coupled to the mounting bracket about a horizontally-extending axis so that the handle bracket may pivot relative to the mounting bracket in a generally vertically-extending plane about a pivot point;
a control handle formed about a single axis and attached to and extending upwardly from the handle bracket near an end of one of the armrests so that the operator may control the lawnmower by moving the control handle primarily with his or her hands while resting his or her forearm on the armrest, the control handle being approximately 4 inches to approximately 12 inches long and angled forward between approximately 5 degrees and approximately 10 degrees from vertical when the respective transmission is in neutral;
a linkage assembly attached directly between the handle bracket and a pick-up point on one of the transmissions, the linkage assembly being connected to the handle bracket approximately 1.5 inches to approximately 3 inches from the pivot point of the handle bracket and being configured to permit the control handle to pivot approximately 20 degrees forward to place the transmission in a full forward speed and approximately 20 degrees rearward to place the transmission in a full reverse speed; and
a dampening cylinder pivotally connected between the mounting bracket and the handle bracket for smoothing movement of the control handle.

* * * * *